United States Patent [19]
Hatamura

[11] Patent Number: 5,142,424
[45] Date of Patent: Aug. 25, 1992

[54] FLOATABLE INFORMATION-READING HEAD SUPPORT CONFIGURED TO PREVENT FORWARD PITCH

[76] Inventor: Yotaro Hatamura, 12-11, Kohinata 2-chome, Bunkyo-ku, Tokyo, Japan

[21] Appl. No.: 540,725

[22] Filed: Jun. 20, 1990

[30] Foreign Application Priority Data

Jul. 12, 1989 [JP] Japan .................................. 1-179920
Nov. 21, 1989 [JP] Japan .................................. 1-302484

[51] Int. Cl.$^5$ .......................... G11B 5/48; G11B 21/21
[52] U.S. Cl. .................................. 360/104; 360/103; 369/44.16
[58] Field of Search ............... 360/104, 103, 105, 106, 360/102, 109; 369/43, 44.11, 44.14, 44.15, 44.16, 44.22, 44.32, 44.33, 244, 247, 251, 254

[56] References Cited

U.S. PATENT DOCUMENTS

| | | | |
|---|---|---|---|
| 3,823,416 | 7/1974 | Warner | 360/122 |
| 3,990,106 | 11/1976 | Kameyama et al. | 360/103 |
| 4,258,400 | 3/1981 | Lazzari | 360/103 |
| 4,261,024 | 4/1981 | Desserre | 360/103 |
| 4,374,402 | 2/1983 | Blessom et al. | 360/104 |
| 4,633,450 | 12/1986 | Gueugnon | 369/44.14 |
| 4,720,088 | 1/1988 | Tamura | 369/44.16 |
| 4,811,143 | 3/1989 | Ohashi et al. | 360/104 |
| 4,922,356 | 5/1990 | Yamaguchi et al. | 360/104 |
| 4,926,274 | 5/1990 | Saitoh et al. | 360/103 |
| 4,954,919 | 9/1990 | Yamada | 360/104 |
| 4,961,121 | 10/1990 | Astheimer et al. | 360/103 |

Primary Examiner—John H. Wolff
Assistant Examiner—Craig A. Renner
Attorney, Agent, or Firm—Oblon, Spivak, McClelland, Maier & Neustadt

[57] ABSTRACT

An information-reading head having a structure comprising a floatable information-reading head, and a suspension comprising a load arm for supporting the information-reading head via a gimbal. The gimbal having a frame structure in a reversed trapezoidal shape constituted by an upper horizontal portion fixed to the load arm, a lower horizontal portion to which the information-reading head is fixed, and a front portion and a rear portion. At least one of the front and the rear portion being inclined, whereby the information-reading head is substantially prevented from pitching forward when coming into contact with a surface of an information-bearing mechanism. The suspension supports the information reading head such that a center of gravity of the information reading head is positioned between a center of support of the information-reading head by the suspension and a rear of the information-reading head.

18 Claims, 14 Drawing Sheets

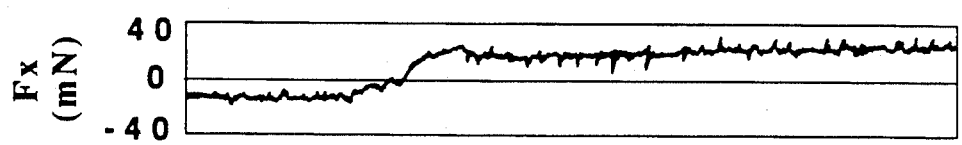
FIG.17a
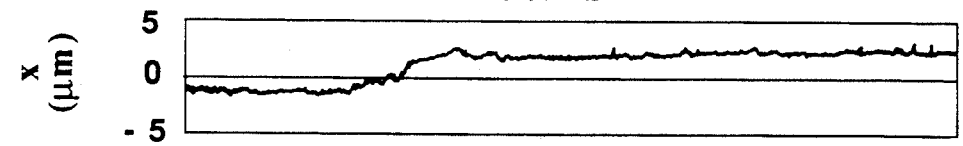
FIG.17b
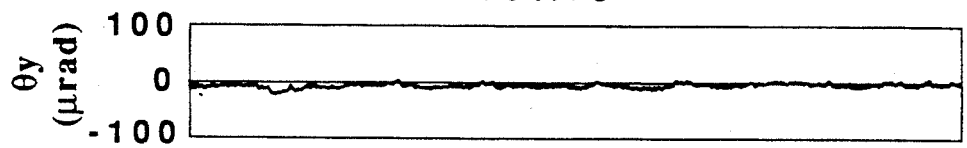
FIG.17c
FIG.17d
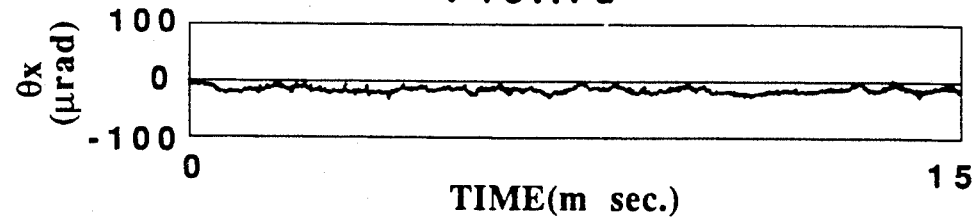
TIME(m sec.)

TIME(m sec.)

1

FLOATABLE INFORMATION-READING HEAD SUPPORT CONFIGURED TO PREVENT FORWARD PITCH

BACKGROUND OF THE INVENTION

The present invention relates to an information-reading head apparatus for reading information from an information-bearing means such as a magnetic disk, a magneto-optical disk, a member to be subjected to a surface roughness test, etc.

In the case of a magnetic disk drive, for instance, as shown in FIG. 9, it comprises a magnetic disk 30 rotating at a constant speed, and a magnetic head 31 movable in a radial or tangential direction of the magnetic disk 30 for conducting the reading and writing of information of the magnetic disk 30. It is well known that to achieve a high record density and a high data transfer speed, most types of magnetic disk drive comprise floating (flying)-type magnetic heads which can stably maintain floating (flying) distance between their magnetic gaps and magnetic disks. In such a floating-type magnetic head, upward dyanamic pressure caused by the viscosity of the an air fast moving together with the magnetic disk 30 relative to the magnetic head 31 is utilized to maintain a flying distance (a small gap) between the magnetic head 31 functioning as a transducer and the magnetic disk 30.

A magnetic head having a portion which generates the above upward dynamic pressure (usually called "floating surface") is called "monolithic head." A typical monolithic head is a Winchester-type head. There is another type of a floating magnetic head called "composite-type head," which comprises a slider having a floating surface and a magnetic core bonded to a slit formed in the slider with bonding glass. Further, there is a thin-film magnetic head which has a magnetic thin film formed on a ceramic substrate for constituting a magnetic transducer.

In any magnetic head, its substrade (slider) is made of a mpm-magnetic material such a $Al_2O_3$-TiC, $ZrO_2$, $CaTiO_3$, etc and the magnetic core functioning as a transducer is made of a magnetic material such as Mn-Zn ferrite, Ni-Zn ferrite, etc.

Each of these magnetic heads is supported by a suspension and pressed onto a disk surface by a spring force of the suspension when the magnetic disk is not rotating. When the magnetic disk starts rotating, upward dynamic pressure is generated by the air flow, so that the magnetic head floats at a height at which the upward dynamic pressure is balanced with the spring force. And when the magnetic disk stops rotating, the magnetic head again comes into contact with the magnetic disk. This system is called "contact start stop (CSS) system."

In addition to the above magnetic disk drives using a CSS system, there is a disk pack-type magnetic disk drive in which a magnetic disk is replaceable. In this magnetic disk drive, a magnetic head called "ramp head" is used.

The support of the magnetic head by a suspension is usually achieved as shown in FIGS. 9, 10 (a). The suspension 3 comprises a head arm 34, a load arm 33 fixed to a tip end portion of the head arm 34, and a gimbal 32 fixed to a tip end portion of the load arm 33. The load arm 33 is generally in a flat plate shape extending in a radial direction of the magnetic disk 30. The gimbals 32 is constituted by a lip portion fixed to a tip end portion of the load arm 33, a base portion to which a magnetic head 31 is fixed, and a pair of link portions integrally extending between the lip portion and the base portion such that it can absorb an external force applied to the magnetic head 31 when coming into contact with the magnetic disk 30.

The head arm 34 is supported by a head arm-moving apparatus (not shown) which enables the magnetic head 31 supported by the suspension 3 to move in a radial or tangential direction with respect to the magnetic disk 30. This head arm-moving apparatus is usually called "positioner" or "actuator." This head arm-moving apparatus comprises a carriage supporting the head arm 34 and a motor for actuating the carriage. The carriage has a linear-type or rotary-type mechanism. A control system for positioning the magnetic head 31 includes an open loop system in which a stepping motor is used, an a closed loop system in which a voice coil motor (VCM) is used. In the case of the closed loop system, there are several systems depending on the method of treating a positioning signal. A system most widely used today is a servo-control system utilizing a servo disk.

Incidentally, there has recently been developed a suspension for a load arm called "inline-type load arm." The inline-type load arm extends in a tangential direction of the magnetic disk 30. With respect to other portions, they are substantially the same as described above.

With respect to the magnetic head 31, it is floated as follows: First, when the magnetic disk 30 is stationary, the magnetic head 31 is slightly pressed onto the magnetic disk 30 under a load of about 10 gf exerted by a spring force of the suspension itself. When the magnetic disk 30 starts rotating, the magnetic head 31 starts floating. A rotation speed of the magnetic disk 30 necessary for floating the magnetic head 31 is, for instance, 4 m/sec. The floating height is usually 0.15-0.5 μm.

Since the magnetic head 31 is usually resting on a disk surface when the disk 30 is not rotating, it is likely that the magnetic head 31 is dragged rearward relative to the suspension 3 by a large friction between the magnetic head 31 and the disk surface. Such a large friction is caused by sticking of the magnetic head 31 to the disk surface due to moisture, etc. When the magnetic head 31 is dragged rearward, the gimbal 32 is deformed as shown in FIG. 10 (b). By this deformation, a front portion of the magnetic head 31 is directed downward. Namely, the magnetic head 31 pitches forward. This "pitch-forward action" of the magnetic head 31 is likely to cause damage to the disk surface.

Also, during the floating period, it is likely that the floating magnetic head 31 comes into contact with the rotating magnetic disk 30 due to the vibration of the magnetic head 31 caused by an external force, or due to the surface roughness of the magnetic disk 30, etc. Also, in the case of landing of the magnetic disk 30, the magnetic head 31 is dragged on the disk surface, or it bounces on the magnetic disk 30 before complete stop.

At the time of landing, the magnetic head 31 is also likely to pitch forward due to a large friction as in the case of taking off.

In such a CSS-type magnetic disk drive, when the magnetic head comes into contact with the magnetic disk during the operation for reason as mentioned above, the magnetic head tends to pitch forward. One reason therefor is that the magnetic head has a center of gravity substantially at a center of support thereof.

Another reason is that the conventional gimbals support the magnetic head such that the magnetic head is not resistant to pitching. This pitch-forward action of the magnetic head gives severe damage to the surface of the magnetic disk, extremely reducing the service life of the magnetic disk. In general, the magnetic disk is required to endure more than 10,000 CSS cycles. However, if there is severe damage caused by the above action, the CSS cycles are as small as 5,000 or so.

Incidentally, to avoid such damage, there has been proposed a so-called load-unload system in which a magnetic head is always kept above a magnetic disk even at the time of start and stop. However, a suspension constituted by a horizontal flat plate is easily twisted, and a gimbal is little resistant to pitching forward and rearward. As a result, it is impossible to prevent the magnetic head from pitching forward and rearward, namely from coming into contact with the magnetic disk in its front or rear portion during the operation.

The problems with the conventional magnetic disk drives are explained above, but the same is true with respect to magneto-optical disk drives, etc.

OBJECT AND SUMMARY OF THE INVENTION

An object of the present invention is to provide an information-reading head apparatus whose information-reading head does not pitch forward during the operation.

Another object of the present invention is to provide an information-reading head apparatus whose suspension is not substantially twisted even when there is a large external force applied to an information-reading head particularly at the time of start and stop, thereby preventing the information-reading head from pitching forward.

The information-reading head apparatus according to the present invention comprises an information-reading head which is kept floating by an air flow generated by the rotation of the information-bearing means, and a suspension for supporting the information-reading head such that the information-reading head pitches substantially rearward at the time of contact with the information-bearing means.

In specific embodiments, the information-reading head apparatus according to one embodiment of the present invention comprises an information-reading head which is kept floating by an air flow generated by the rotation of the information-bearing means, and a suspension for supporting the information-reading head such that a center of gravity of the information-reading head is positioned between a center of support of the information-reading head by the suspension and a rear end of the information-reading head.

The information-reading head apparatus according to another embodiment of the present invention comprises a floatable information-reading head, and a suspension comprising a load arm for supporting the information-reading head via a gimbal, the gimbal having a frame structure in a reversed trapedzoidal shape constituted by an upper horizontal portion fixed to the load arm, a lower horizontal portion to which the information-reading head is fixed, and a front portion and a rear portion at least one of the front portion and the rear portion being inclined, whereby the information-reading head is substantially prevented from pitching forward when coming into contact with a surface of the information-bearing means.

The information-reading head apparatus according to a further embodiment of the present invention comprises:
(a) an information-reading head which is kept floating by an air flow generated by the rotation of the information-bearing means; and
(b) a suspension comprising:
   (i) a head arm supported by a head arm moving apparatus such that the head arm is movable back and forth;
   (ii) a load arm fixed to a tip end portion of the head arm; and
   (iii) a gimbal fixed to a tip end portion of the load arm, the gimbal having a frame structure in a reversed trapezoidal shape constitued by an upper horizontal portion fixed to the load arm, a lower horizontal portion to which the information-reading head is fixed, and a front portion and a rear portion, at least one of the front portion and the rear portion being inclined, whereby the information-reading head is substantially prevented from pitching forward when coming into contact when a surface of the information-bearing means.

BRIEF DESCRIPTION OF THE DRAWINGS

FIG. 3 (b) is a schematic view showing the deformation of the gimbal shown in FIG.3 (a);

FIG. 10 (b) is a schematic view showing the deformation of the gimbals shown in FIG. 10 (a);

FIG. 17 (a)-(d) is a graph showing the test results in Example 1; and

DETAILED DESCRIPTION OF THE INVENTION

The present invention will be described in detail referring to the attached drawings.

Figure 1:
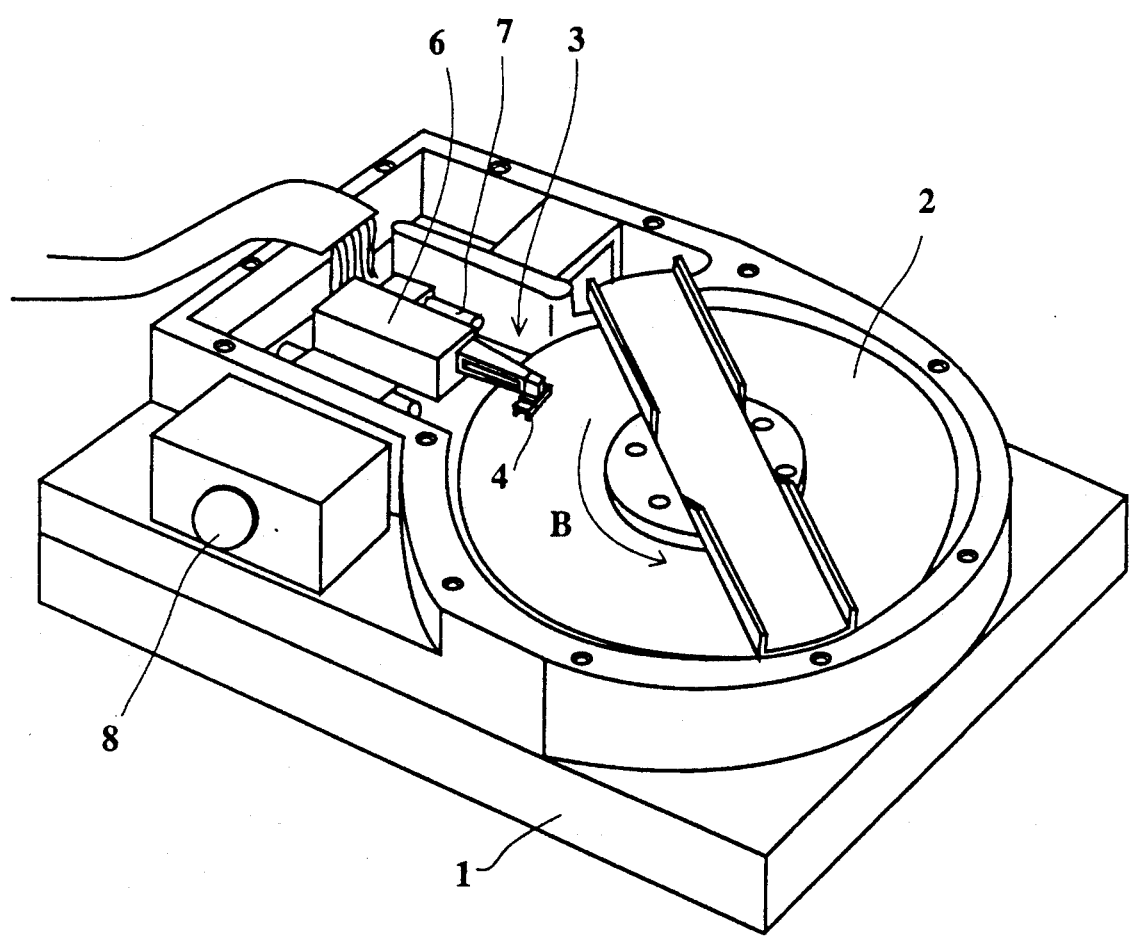
FIG. 1 is a perspective view showing the magnetic disk drive according to one embodiment of the present invention.

Referring to FIG. 1, the magnetic disk drive according to one embodiment of the present invention comprises a casing 1, a magnetic disk 2 rotatable in a direction B by a motor (not shown), a suspension 3 supported by a carriage 6, a magnetic head 4 fixed to a tip end portion of the suspension 3, a guide shaft 7 along which the carriage 6 is movable, and a motor 8 for moving the carriage 6 back and forth.

Figure 2:
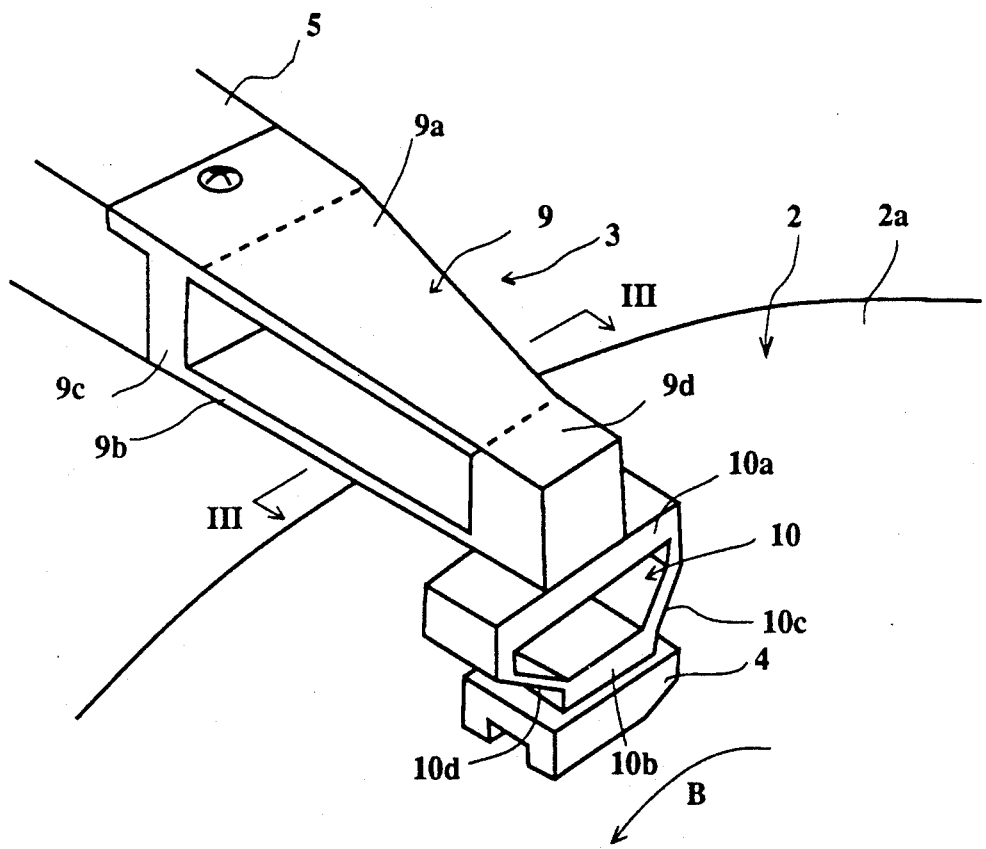
FIG. 2 is a perspective view showing the suspension contained in the magnetic disk drive according to one embodiment of the present invention.

Referring to FIG. 2, the suspension 3 comprises a head arm 5 fixed to the carriage 6 by bolts, etc., a load arm 9 fixed to a tip end portion of the head arm 5, and a gimbal 10 fixed to a tip end portion of the load arm 9.

In this embodiment, the load arm 9 has an upper horizontal flat plate 9a, a lower horizontal flat plate 9b, a root portion 9c integrally connected to both upper and lower horizontal flat plates 9a, 9b, and a tip end portion 9d integrally connected to both upper and lower horizontal flat plates 9a, 9b. Accordingly, the load arm 9 is in a parallel plate structure. The root portion 9c of the load arm 9 is fixed to the head arm 5 by a bolt, etc.

Figure 3A:
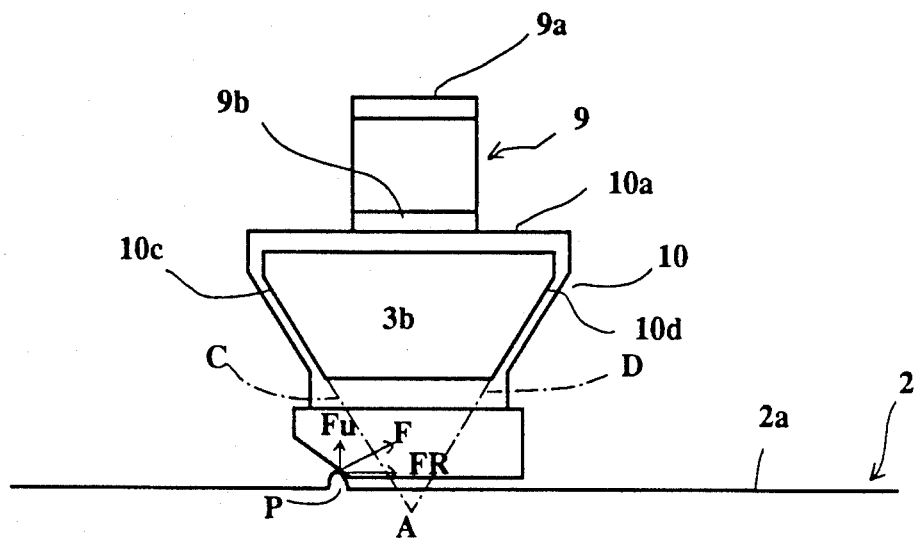
FIG. 3 (a) is an enlarged cross-sectional view taken along line III—III in FIG. 2.
Figure 3B:
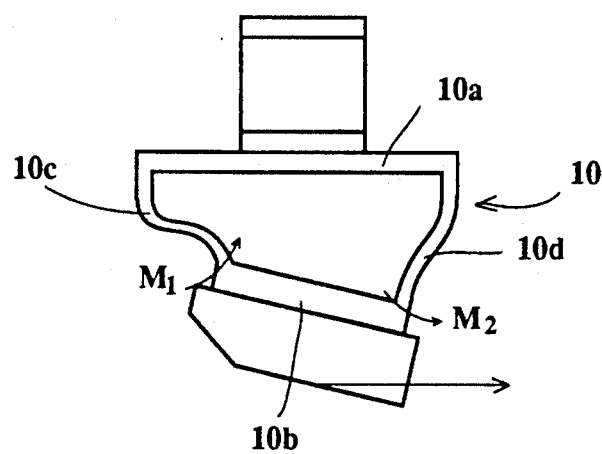

As shown in FIG. 3 (a), the upper and lower horizontal flat plates 9a, 9b of the load arm 9 are substantially in parallel with the disk surface 2a. Accordingly, the load arm 9 is deflectable vertically, but it is highly resistant to twisting.

Figure 14A:
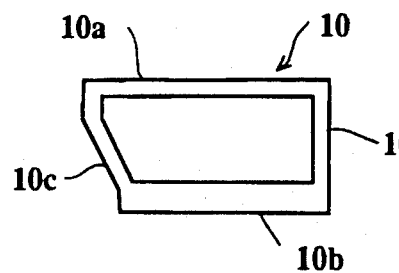
FIGS. 14 (a)–(b) are enlarged views showing various shapes of the gimbal used in the present invention.
Figure 14B:
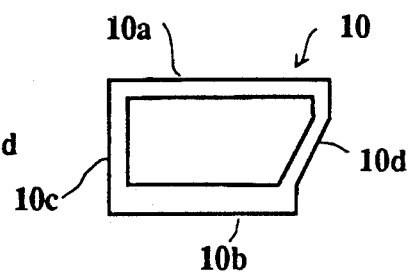

As is clearly shown in FIGS. 2, 3 (a), the gimbal 10 is in a frame structure consituted by an upper horizontal portion 10a, a lower horizontal portion 10b, an inclined front portion 10c and an inclined rear portion 10d. Since the upper horizontal portion 10a is longer than the lower horizontal portion 10b, the frame structure of the gimbal 10 is in a reversed trapezoidal shape. The gimbal 10 may be made of a metal plate so that it can be deformed resiliently. The front portion 10c and the rear portion 10d are inclined such that their extended lines C, D intersect at a point A below the disk surface 2a. Incidentally, the gimbal 10 may be in any other shape as long as the extended lines C, D of the front portion 10c and the rear portion 10d intersect at a point below the disk surface 2a. FIGS. 17 (a)-(b) show examples of the gimbal, A gimbal in FIG. 14 (a) has an inclined front portion 10c and a substantially vertical rear portion 10d. A gimbal in FIG. 14 (b) has a substantially vertical front portion 10c and an inclined rear portion 10d. Incidentally, although the gimbal 10 is exaggerated in the figures, it should be noted that the gimbal 10 is much smaller than depicted, and that accordingly, the front and rear portions 10c, 10d are much thinner than the upper and lower plates 9a, 9b of load arm 9. Therefore, the pitching of the head 4 is mostly absorbed by the gimbal 10.

Next, explanation will be made on how the gimbal 10 is deformed upon receiving an external force during the operation.

When the disk 2 starts rotating, it is likely that there is a large friction between the magnetic head 4 and the disk 2, since the magnetic head 4 is sticking to the disk surface 2a for various reasons such as the existence of moisture. In such a case, the lower portion 10b is dragged rearward relative to the upper portion 10a as shown in FIG. 3 (b). Both front and rear portions 10c, 10d are subjected to a rearward force, so that they are deformed rearward as shown by $M_1$, $M_2$, respectively. Incidentally, because each of the front portion 10c and the rear portion 10d is connected to the upper portion 10a and the lower portion 10b, respectively, its deformation is as shown in FIG. 3 (b) when depicted exaggeratedly. By this deformation, a front portion of the magnetic head 4 fixed to the lower portion 10b of the gimbal 10 is lifted, while a rear portion of the magnetic head 4 is lowered, as is clear from FIG. 3 (b). In this case, since a distance between an upper surface of the lower portion 10b of the gimbals 10 and a lower surface of the magnetic head 4 is constant, the decrease in height of the rear portion 10d when it is deformed as shown in FIG. 3 (b) is compensated by the lifting of the load arm 9. In any case, since a front portion of the magnetic head 4 is lifted when the disk 2 starts to rotate, the magnetic head 4 can be lifted easily. This so-called "pitch-rearward action" of the magnetic head is completely opposite to the pitch-forward action of the conventional magnetic head apparatus. In the present invention, even though the magnetic head 4 is sticking to the disk surface 2a by moisture, etc., the magnetic head 4 is easily peeled off from the disk surface 2a, starting to float.

During the rotation of the disk 2, when there is a small projection P on the disk surface 2a, the bottom surface of the magnetic head 4 impinges it and receives an upward force $F_U$. Since the magnetic disk 2 is rotating, the projection P also gives a rearward force $F_R$ to the magnetic head 4. The above upward force $F_U$ and the rearward force $F_R$ are combined to provide an inclined upward force F. Since the rear portion 10d receives the inclined upward force F nearly in paralled with its longitudinal direction, the rear portion 10d is not substantially deformed in its longitudinal direction but deformed in its transverse direction. On the other hand, the front 10c receives the inclined upward force F in such a direction that the front portion 10c is deformed in the direction perpendicular to its longitudinal direction. Accordingly, the magetic head 4 slightly pitches rearward. In other words, a front portion of the magnetic head 4 tends to move upward when passing over projections of the magnetic disk 2, without impinging them strongly. In this way, the magnetic head 4 can be prevented from pitching forward when receiving an external force from projections of the magnetic disk 2, etc., so that the magnetic disk 2 can be protected from scratching by the magnetic head 4. On the other hand, when the intersection A is above the disk surface 2a, the magnetic head 4 pitches relatively easily. Accordingly, the intersection A is preferably below the disk surface 2a.

When the magnetic head 4 lands the disk 2, the magnetic head 4 is also subjected to a large friction, whereby it is dragged rearward. Accordingly, the same deformation of the front and rear portions 10c, 10d takes place as in the case of taking off. Thus, a front portion of the magnetic head 4 is slightly lifted upward, thereby certainly preventing the magnetic head 4 from crashing the disk surface 2a.

Figure 4:
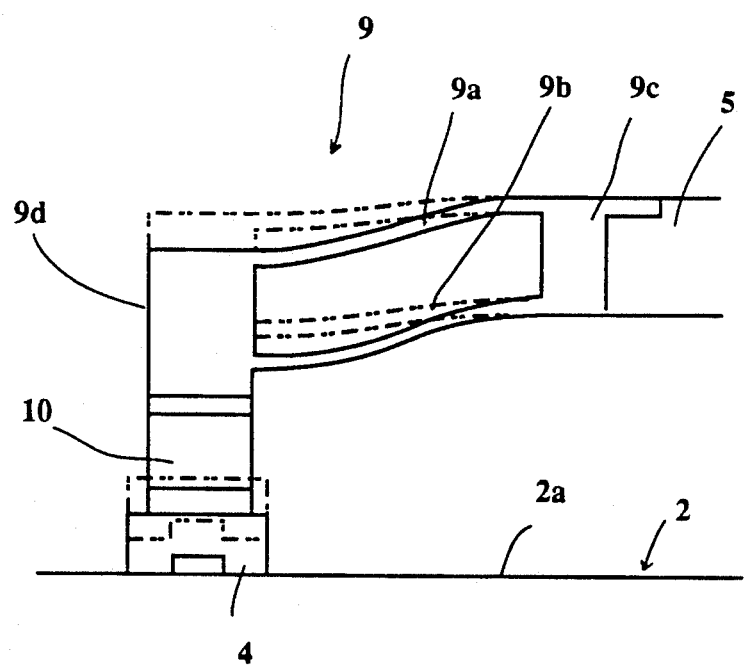
FIG. 4 is an enlarged view showing the deformation of the load arm.

In this embodiment, since the load arm 9 is constituted by a pair of horizontal flat plates 9a, 9b, the upper horizontal portion 10a of the gimbal 10 fixed to the load arm 9 is always kept horizontal while moving up and down depending upon the surface roughness of the magnetic disk 2, as shown in FIG. 4. This structure of the load arm 9 surely prevents the load arm 9 from being twisted by a force exerted by the surface roughness of the magnetic disk 2. Accordingly, a large pitching action of the magnetic head 4 is effectively prevented.

Figure 5:
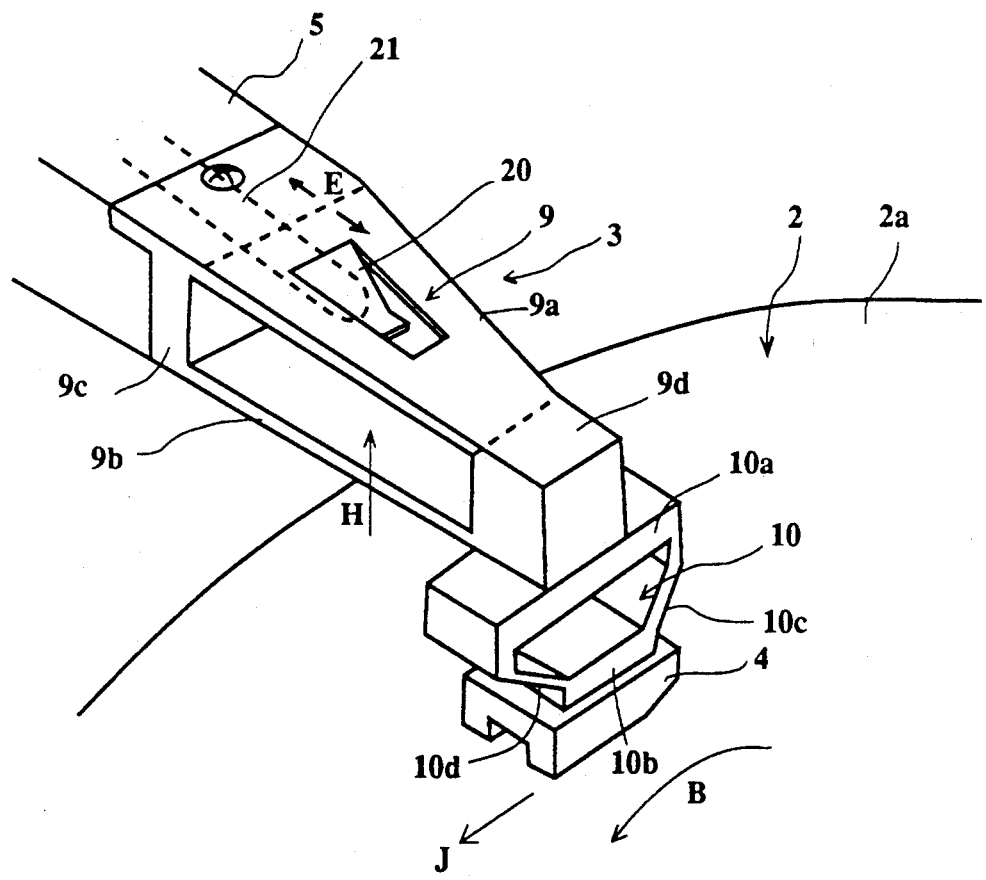
FIG. 5 is a perspective view showing a suspension contained in the magnetic disk drive according to another embodiment of the present invention.

FIG. 5 shows a suspension 3 according to another embodiment of the present invention. In this suspension 3, an upper horizontal flat 9a of a load arm 9 has a lip portion 20 slightly bent downward toward a tip of the load arm 9. The lip portion 20 is formed by cutting the upper horizontal flat 9a and bending a cut portion slightly downward. A pin 21 is disposed in a head arm 5 and movable back and forth as shown by the arrow E by means of an actuator (not shown) such as a solenoid. The pin 21 may be in the shape of a rod or plate.

In this suspension 3, when the pin 21 moves forward (toward the magnetic disk 2), a tip end portion of the pin 21 comes into contact with the lip portion 20 and slides along it, exerting an upward force to the suspension 3. As a result, the suspension 3 moves upward as shown by the arrow H. This can prevent the magnetic head 4 from being damaged by abnormally large friction, etc.

Figure 6:
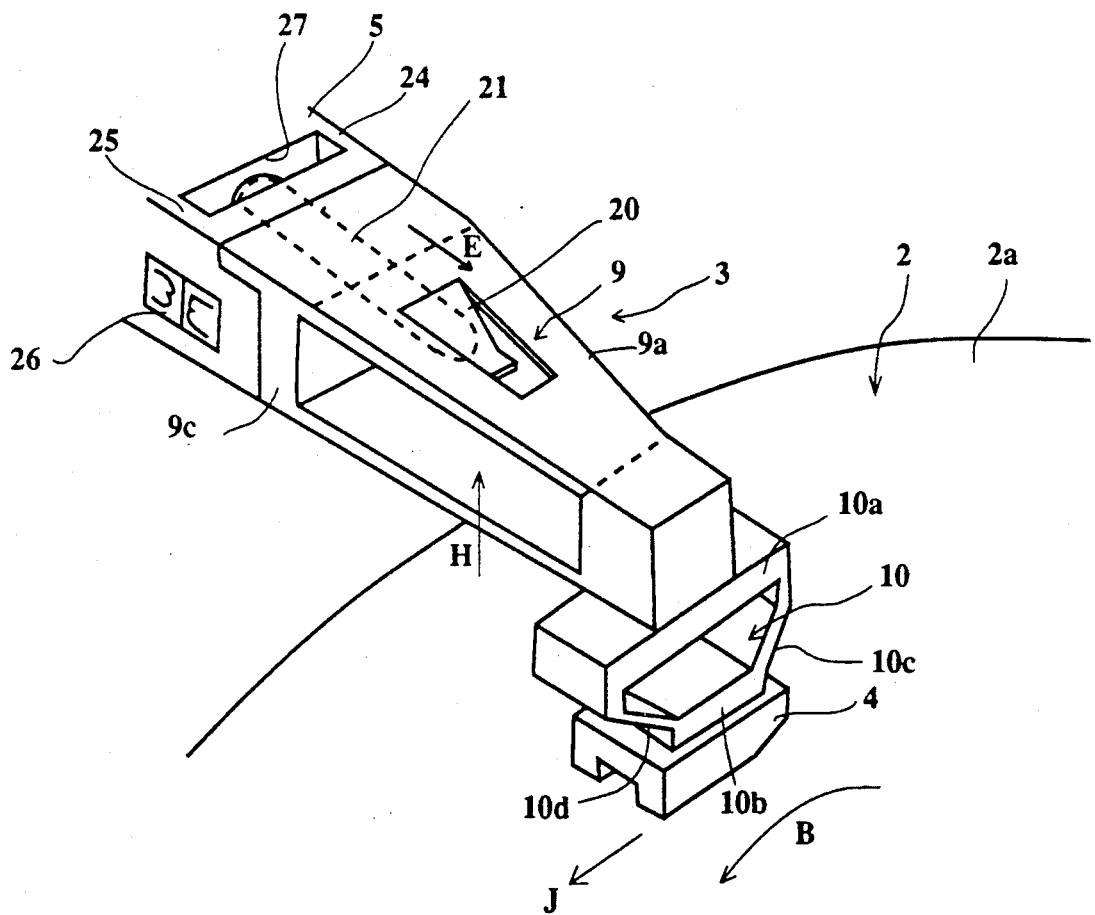
FIG. 6 is a perspective view showing a suspension contained in the magnetic disk drive according to a further embodiment of the present invention.

FIG. 6 shows a suspension 3 according to a further embodiment of the present invention. In this suspension 3, a head arm 5 has an opening 27 extending vertically such that there are a pair of thin portion 24, 25 on both lateral sides of the opening 27. At least one strain gauge 26 is attached to an outer surface of at least one of the thin portion 24, 25. Incidentally, in this embodiment, a pair of strain gauges 26, 26 are attached to one outer surface. An output of the strain gauge 26 is supplied to a control circuit (not shown) which provides a control signal for actuating the pin 21. With respect to other portions, the suspension 3 of FIG. 6 is substantially the same as that of FIG. 5.

In a magnetic disk drive comprising such suspension 3 shown in FIG. 6, when the magnetic head 4 receives an abnormally strong external force (rearward direction) shown by the arrow J, such as a friction force, most of the horizontal deformation occurs in the thin portions 24, 25, since the load arm 9 constituted by a pair of horizontal flat plates 9a, 9b is highly resistant to lateral deformation. When the thin portions 24, 25 are deformed, the deformation is detected by the strain gauge 26. As a result, the friction force can be detected. A detection signal from the strain gauge 26 is supplied to the control circuit which in turn provides a control signal for actuating the pin 21 such that the suspension 3 is deflected upward to avoid a large friction.

Figure 7:
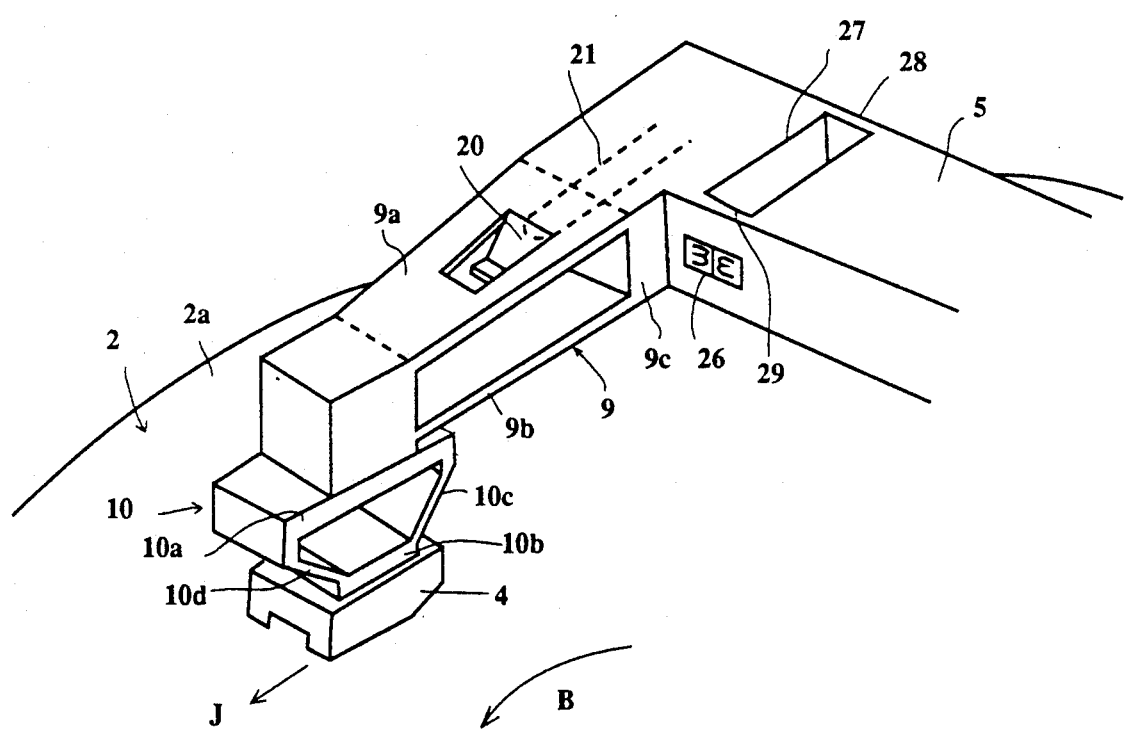
FIG. 7 is a perspective view showing a suspension contained in the magnetic disk drive according to a still further embodimnet of the present invention.

FIG. 7 shows a suspension 3 arranged as an inline-type, which is provided with a deformation-detecting means. In this embodiment, the deformation-detecting means is a strain gauge 26 attached to a head arm 5 to which a load arm 9 is fixed perpendicularly. The head arm 5 also has a vertical opening 27 to leave a pair of thin portions 28, 29 on both lateral sides of the head arm 5. When the magnetic head 4 is subjected to an external force in a rotational direction J as shown in FIG. 7, the thin portions 28, 29 are deformed, and their deformation is detected by the strain gauge 26.

Figure 8:
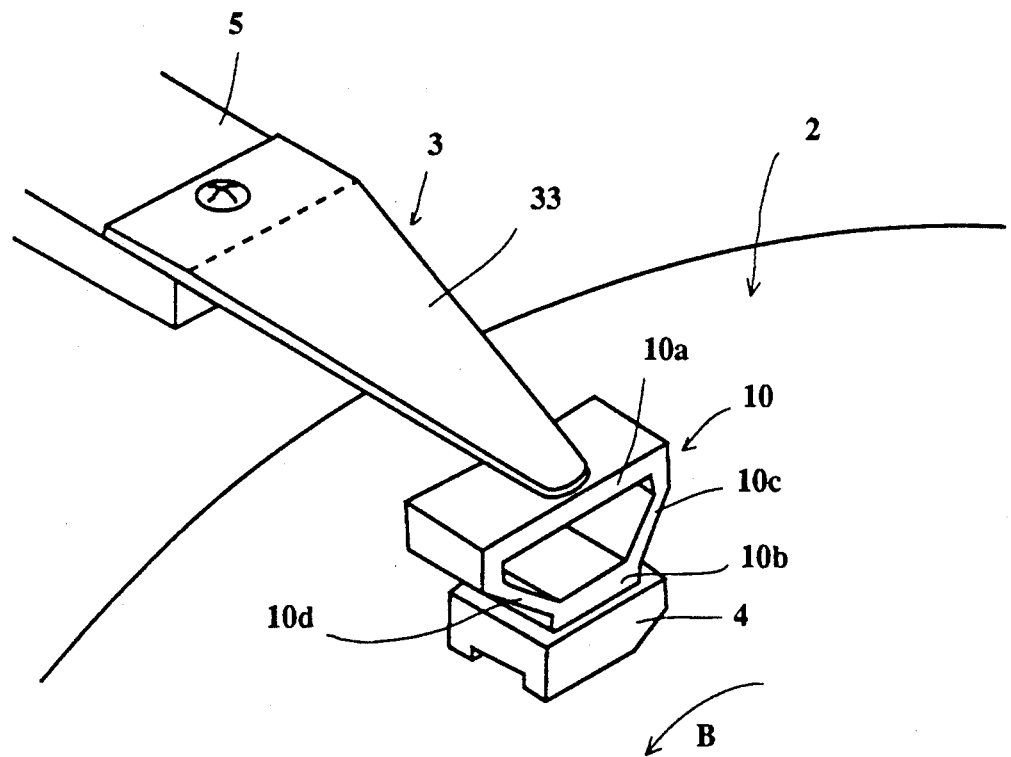
FIG. 8 is a perspective view showing a suspension contained in the magnetic disk drive according to a still further embodiment of the present invention.

FIG. 8 shows a suspension 3 according to a still further embodiment of the present invention. This suspension 3 comprises a load arm 33 constituted by a single horizontal, flat plate. When a magnetic head 4 comes into contact with small surface projections of a rotating magnetic disk 2, the magnetic head 4 receives a rearwardly inclined upward force. Accordingly, a gimbal 10 is deformed in the same manner as explained above in connection with FIG. 3. Therefore, the suspension 3 of FIG. 8 can prevent the magnetic head 4 from pitching forward when it impinges the surface roughness of the magnetic disk 2.

Figure 11:
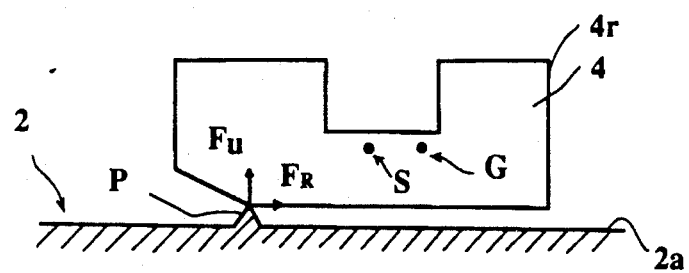
FIG. 11 is a schematic view showing a magnetic head according to still further embodiment of the present invetnion.
Figure 9:
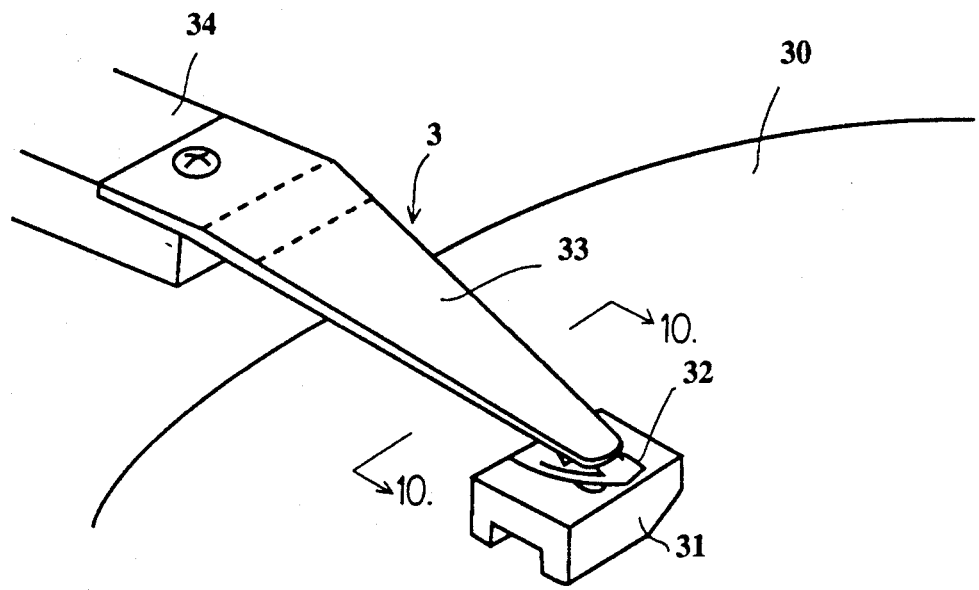
FIG. 9 is a perspective view showing a conventional suspension.
Figure 10A:
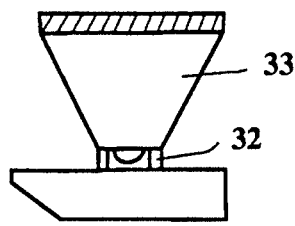
FIG. 10 (a) is an enlarged cross-sectional view taken along XI—XI in FIG. 9.
Figure 10B:
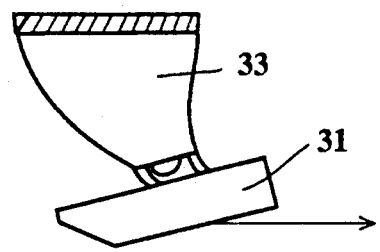

FIG. 11 schematically shows a magnetic head 4 floating above a disk surface 2a. The magnetic head 4 is supported such that a center of gravity G of the magnetic head 4 is positioned between a center of support S of the magnetic head 4 and a rear end 4r of the magnetic head 4. Here, the term "center of support" is defined as a center of a suspension around which the suspension is twisted, thereby causing the pitching of the magnetic head 4. Usually, since a center of an upper surface of the magnetic head 4 is supported by the suspension, the center of support S is positioned at the geometrical center of the magnetic head 4. As far as a longitudinal position is concerned, a typical center of support S is positioned at a middle point between the front and rear ends of the magnetic head 4. However, when the magnetic head 4 is supported a position separate from a center of its upper surface, the center of support S is naturally deviated from the geometrical center of the magnetic head 4. Incidentally, a verical position of the center of support S is determined by the suspension mechanism. Thus, although the center of suppport S is depicted at the same height as the center of gravity G in FIG. 11, a vertical position of the center of support S is not restricted thereto.

In order that the center of gravity G is positioned behind the center of support S in the magnetic head 4, any means can be utilized. For instance, a proper weight can be fixed to a rear portion of the magnetic head 4.

When the floating magnetic head 4 having the above structure impinges a surface projection P of a rotating magnetic disk 2, the magnetic head 4 receives a rearward force $F_R$ and an upward force $F_U$ as shown in FIG. 11. In this case, since the center of gravity G is positioned behind the center of support S, the magnetic head 4 tends to pitch rearward. Detailed reason therefor is as follows:

Since there are a number of projections on the disk surface 2a, a bottom surface of the magnetic head 4 receives a number of upward forces $F_{U1}$, $F_{U2}$, ... and a number of rearward forces $F_{R1}$, $F_{R2}$, .... All rearward forces $F_{R1}$, $F_{R2}$, ... serve to pitch the magnetic head 4 forward. With respect to upward forces $F_{U1}$, $F_{U2}$, ..., those in front of the center of gravity G serve to pitch the magnetic head 4 rearward, while those behind the center of gravity G serve to pitch the magnetic head 4 forward. Here, if the center of gravity G is substantially at the same longitudinal position as the center of support S, a moment due to a sum of the upward forces in front of the center of gravity G is substantially the same as a moment due to a sum of the upward forces behind the center of gravity G, because the center of support S is located substantially at a midpoint. Accordingly, the influence of the upward forces $F_{U1}$, $F_{U2}$, ... on the pitching action is substantially off-set. On the other hand, if the center of gravity G is behind the center of support S as shown in FIG. 11, a moment (I) due to a sum of the upward forces in fornt of the center of gravity G is larger than a moment (II) due to a sum of the upward forces behind the center of gravity G. The difference between the moment (I) and the moment (II) is larger than a moment in an opposite direction due to the rearward forces $F_{R1}$, $F_{R2}$, ... Therefore, in totality, the magnetic head 4 is subjected to a pitch-rearward action due to the predominant moment (I).

Experiments show that the center of gravity G is preferably positioned behind the center of support S in a range of 5–50%, more preferably 10–40%, particularly 15–30% per a distance (100%) between the center of support S and the rear end 4r of the magnetic head 4.

The support system of the present invention functions to protect both of the magnetic head 4 and the magnetic disk 2. It should be noted that this support system is not restricted to magnetic disk drives but applicable to many other apparatuses such as magnetic field modulation-type magneto-optical disk drives, surface defect-detecting apparatuses for round steel rods, etc., optical disk drives, VTRs, floppy disk drives, etc.

Figure 12:
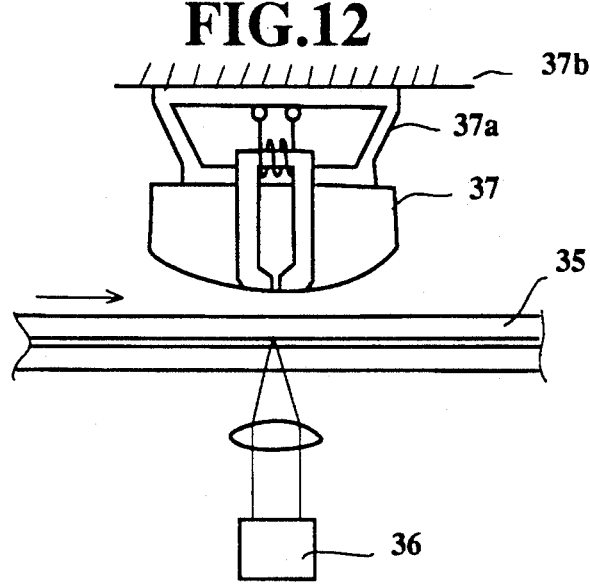
FIG. 12 is an enlarged view showing an important portion of a magneto-optical disk drive.

FIG. 12 schematically shows a magneto-optical disk drive in which a disk 35 is rotating between a magnetic head 37 and a laser system 36. A suspension for this magnetic head 37 has essentially the same mechanism as described above. Namely, the magnetic head 37 is fixed to a gimbal 37a which is in turn fixed to a load arm 37b.

Figure 13:
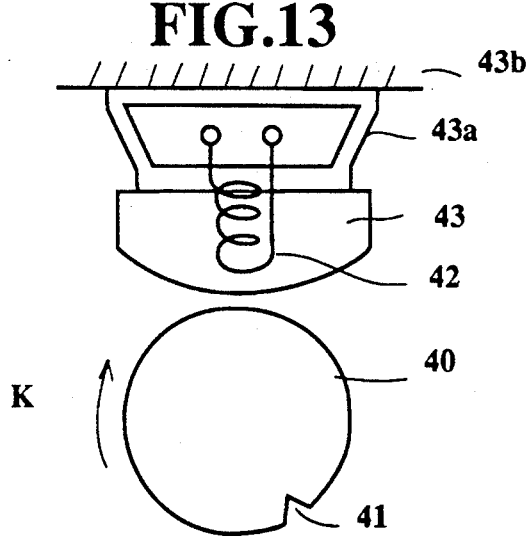
FIG. 13 is an enlarged view showing an important portion of a surface defect detector.

FIG. 13 schematically shows a surface defect-detecting apparatus which comprises a head 43 having a search coil 42, a gimbal 43a fixedly supporting the head 43, and a load arm 43b fixedly supporting the gimbals 43a. A round steel rod 40 having a surface defect exaggeratedly shown by "41" is rotating in a direction K in FIG. 13. The head 43 is floating by dynamic pressure exerted by an air flow generated by the rotating round rod 40. The head 43 is always kept at a constant distance from a surface of the round rod 40 due to the balance between a spring force of the load arm 43b and the dynamic pressuer exerted by the rotating round rod 40. Incidentally, FIG. 13 exaggerates the size of the head 43, but the head 43 is usually extremely smaller than the round rod 40. Accordingly, near the head 43, a surface of the round rod 40 may be assumed substantially flat. Therefore, the head 43 can function substantially in the same manner as the magnetic head 4.

EXAMPLE 1

Figure 15:
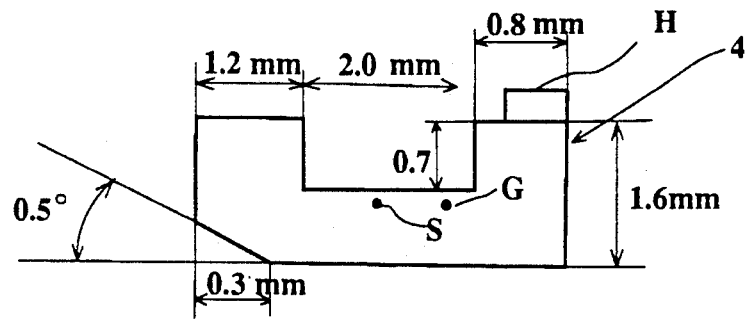
FIGS. 15 is a schematic view showing one example of the magnetic head tested in Example 1.

A magnetic head shown in FIG. 15 was tested with respect to its movement when floating above a rotating disk.

The magnetic head constituted by a slider made of $CaTiO_3$ and a magnetic core made of Mn-Zn ferrite was in a shape shown in FIG. 15. Incidentally, the magnetic head 4 had a width of 3 mm. The magnetic head 4 weighed 66 mg, and it was provided with a weight H of 12 mg on a top surface adjacent to the rear end of the magnetic head 4.

The magnetic head 4 was supported by a suspension (not shown) and pressed downward by a spring force of 94 mN.

The disk was a flat glass disc having a radius of 35 mm and a surface roughness Ra of 0.56 nm, which was not subjected to a texture treatment. A surface of the disk was coated with a liquid lubricant in an average thickness of 3.5 nm.

Figure 16:
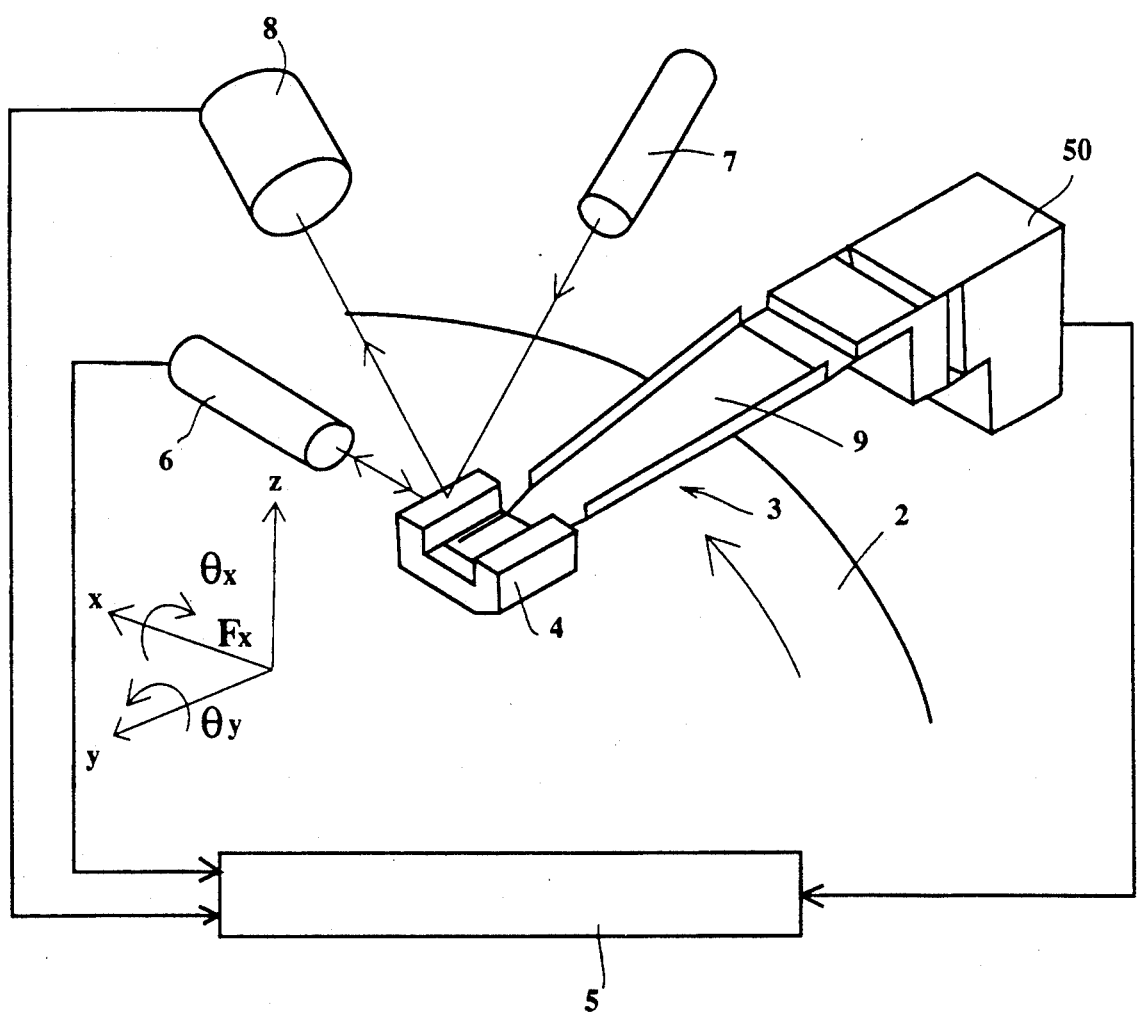
FIG. 16 is schematic view showing a test system of the magnetic head.
Figure 18A:
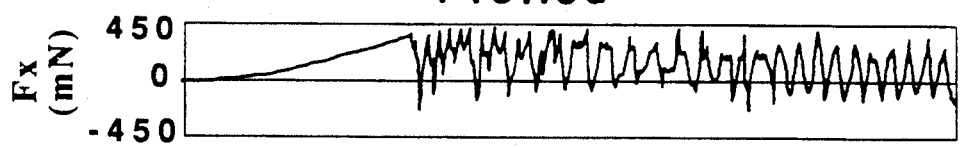
FIG. 18 (a)-(d) is a graph showing the test results in Comparative Example 1.
Figure 18B:
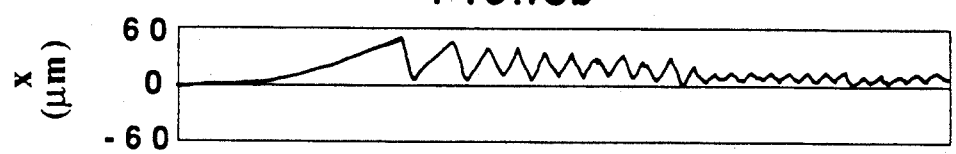
Figure 18C:
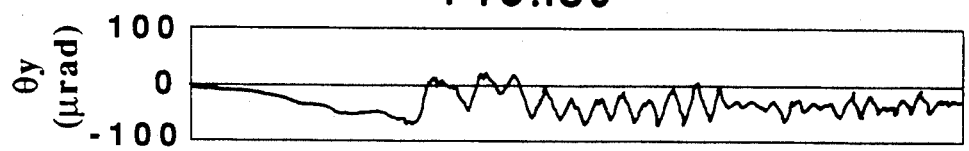
Figure 18D:
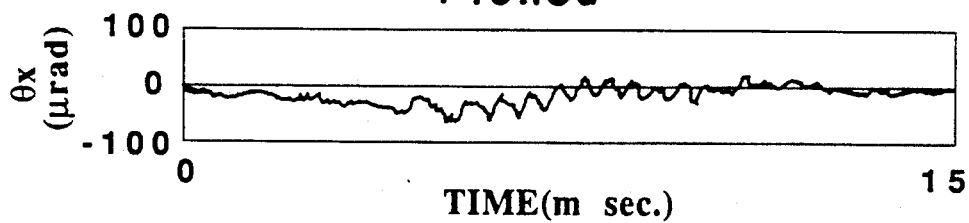

The magnetic head 4 supported by a suspension 3 was assembled in a magnetic disk drive to measure its movement as shown in FIG. 16. The suspension 3 comprised a load arm 9 supporting the magnetic head 4 and a base 50 supporting the load arm 9. The base 50 comprised a sensor (strain gauge) for detecting a friction $F_x$ between the magnetic head 4 and the disk 2 in a rotational direction of the disk 2, and a detection signal was processed in a personal computer (not shown).

To detect the displacement (X) of the magnetic head 4 along the friction direction, a non-contact displacement sensor 6 of an optical reflection type was used. Also, to measure the pitching ($\theta_y$) and the rolling ($\theta_x$) of the magnetic head 4, a laser apparatus 7 and a photosensor 8 for receiving laser beams reflected from the magnetic head 4 were used. Signals from the displacement sensor 6 and the photosensor 8 were also processed by the personal computer.

In the test apparatus as mentioned above, the disk 2 was rotated and stopped repeatedly to measure $F_x$, X, $\theta_y$ and $\theta_x$.

COMPARATIVE EXAMPLE 1

The same magnetic head 4 as in Example 1 except for having no weight was used to measure $F_x$, X, $\theta_y$ and $\theta_x$ in the same test apparatus as in Example 1. The magnetic head 4 in this Comparative Example had a center of gravity G positioned on a center of support S of the magnetic head 4.

The measurement results at the time of start are shown in FIG. 17 (Example 1) and FIG. 18 (Comparative Example 1).

As is clear from FIGS. 17, 18, in the case of the magnetic head in Example 1, friction $F_x$ and displacement "X" at the time of start are smaller than those in Comparative Example 1. In addition, the magnetic head of Example 1 suffers from smaller pitching $\theta_y$ and rolling $\theta_x$ than that of Comparative Example 1. This difference is due to the fact that slipping while sticking to the disk surface takes place in the magnetic head of Comparative Example 1 at the time of start, resulting in large friction.

In addition, it was confirmed that good sliding took place in the magnetic head of Example 1 at the time of stop.

As described above in detail, since the information-reading head apparatus of the present invention has a head supported by a suspension such that the information-reading head rather pitches rearward when coming into contact with surface roughness of an information-bearing means, the pitch-forward action of the information-reading head can be effectively prevented. Accordingly, the information-bearing means is effectively protected from surface damage due to rough contact with the information-reading head.

Also, by supporting the information-reading head by a suspension such that a center of gravity of the information-reading head is positioned behind a center of support of the information-reading head, the sticking and crushing of the information-reading head to the information-reading means can be prevented at the time of start and stop. When the information-reading head comes into contact with a surface roughness of the rotating information-reading means, the information-reading head rather tends to pitch rearward slightly, avoiding the pitch-forward action of the information-reading head which leads to the crushing of the information-reading head to the information-reading means. By this action, the pitching and rolling of the information-reading head are minimized.

What is claimed is:

1. An information-reading head apparatus for reading information from an information-bearing means comprising a floatable information-reading head, and a suspension comprising a load arm for supporting said information-reading head via a gimbal, said gimbal having a frame structure in a reversed trapezoidal shape constituted by an upper horizontal portion fixed to said load arm, a lower horizontal portion to which said information-reading head is fixed and which is shorter in length than said upper horizontal portion, a deformable front portion, with respect to a direction of relative movement of said information-reading head to said information-bearing means, and a deformable rear portion, with respect to said direction of relative movement of the information-reading head to the information bearing means, each of said front portion and rear portion integrally connecting said upper horizontal portion and said lower horizontal portion, at least one of said front portion and said rear portion being inclined, whereby said information-reading head is substantially prevented from pitching forward when coming into contact with a surface of the information-bearing means.

2. The information-reading head apparatus according to claim 1, wherein at least one of said deformable front portion and deformable rear portion of said gimbal is inclined such that an extended line of each of said front portion and rear portion intersect at a point below a surface of said information-bearing means.

3. The information-reading head apparatus to claim 1, wherein said suspension is provided with a load arm deflection means for moving said information-reading head upward away from a surface of said information-bearing means.

4. The information-reading head apparatus according to claim 3, wherein said information-reading head is kept above said information-bearing means by said load arm deflection means when said information-bearing means is not rotating at a sufficient speed.

5. The information-reading head apparatus according to claim 3, wherein said load arm deflection means comprises a downward inclined member provided in said load arm, and a pin supported by a head arm and movable axially along said load arm, said load arm being moved upward by contact of said downward inclined member with said pin moving forward.

6. The information-reading head apparatus according to claim 5 wherein said information-reading head is kept above said information-bearing means by said load arm deflection means when said information-bearing means is not rotating at a sufficient speed.

7. The information-reading apparatus according to claim 3, further comprising a deformation detection means attached to a head arm, and a control mechanism receiving a signal from said deformation detection means for actuating said load arm deflection means when an abnormal deformation is detected.

8. The information-reading head apparatus according to claim 7, wherein said deformation detection means is a strain gauge attached to a thin portion of said head arm.

9. The information-reading head apparatus according to claim 8, wherein said thin portion extends on each side of a vertical opening in said head arm.

10. An information-reading head apparatus for reading information from an information bearing means comprising a floatable information-reading head, and a suspension comprising a load arm for supporting said information-reading head via a gimbal, said gimbal having a frame structure in a reversed trapezoidal shape constituted by an upper horizontal portion fixed to said load arm, a lower horizontal portion to which said information-reading head is fixed and which is shorter in length than said upper horizontal portion, a deformable front portion, with respect to a direction of relative movement of said information-reading head to said information bearing means, and a deformable rear portion, with respect to said direction of relative movement of the information-reading head to the information bearing means, each of said portion and rear portion integrally connecting said upper horizontal portion and said lower horizontal portion, at least one of said front portion and said rear portion being inclined, whereby said information-reading head is substantially prevented from pitching forward when coming into contact with a surface of the information-bearing means; wherein:

said suspension is provided with a load arm deflection means for moving said information-reading head upward away from a surface of said information-bearing means; and said load arm deflection means comprises a downward inclined member provided in said load arm, and a pin supported by a head arm and movable axialy along said load arm, said load arm being moved upward by contact of said downward inclined member with said pin moving forward.

11. An information-reading head apparatus for reading information from an information bearing means comprising a floatable information-reading head, and a suspension comprising a load arm for supporting said information-reading head via a gimbal, said gimbal having a frame structure in a reversed trapezoidal shape constituted by an upper horizontal portion fixed to said load arm, a lower horizontal portion to which said information reading head is fixed and which is shorter in length than said upper horizontal portion, a deformable front portion, with respect to a direction of relative movement of said information-reading head to said information bearing means, and a deformable rear portion, with respect to said direction of relative movement of the information-reading head to the information bearing means, each of said front portion and rear portion integrally connecting said upper horizontal portion and said lower horizontal portion, at least one of said front portion and said rear portion being inclined, whereby said information-reading head is substantially prevented from pitching forward when coming into contact with a surface of the information-bearing means; wherein:

said suspension is provided with a load arm deflection means for moving said information-reading head upward away from a surface of said information-bearing means; and said information-reading head apparatus further comprises a deformation detection means attached to a head arm, and a control mechanism receiving a signal from said deformation detection means for actuating said load arm deflection means when an abnormal deformation is detected.

12. An information-reading head apparatus for reading information from an information-bearing means comprising:

(a) an information-reading head which is kept floating by an air flow generated by a rotation of said information-bearing means; and (b) a suspension comprising:

(i) a head arm supported by a head arm moving apparatus such that said head arm is movable back and forth;

(ii) a load arm fixed to a tip end portion of said head arm; and (iii) a gimbal fixed to a tip end portion of said load arm, said gimbal having a frame structure in a reversed trapezoidal shape constituted by an upper horizontal portion fixed to said load arm, a lower horizontal portion to which said information-reading read is fixed and which is shorter in length than said upper horizontal portion, a deformable front portion, with respect to a direction of relative movement of the information-recording head to the rotating information bearing means, and a deformable rear portion, with respect to said direction of relative movement of the information-recording head to the rotating information bearing means, each of said front portion and rear portion integrally connecting said upper horizontal portion and said lower horizontal portion, at least one of said front portion and said rear portion being inclined, whereby said information-reading heading is substantially prevented from pitching forward when coming into contact with a surface of said information-bearing means.

13. The information-reading head apparatus according to claim 12, wherein said load arm is constituted by a flat plate substantially parallel with a surface of said information-bearing means.

14. The information-reading head apparatus according to claim 12 wherein, said load arm is constituted by a pair of flat plates both substantially in parallel with a surface of said information-bearing means.

15. An information-reading head apparatus for reading information from an information-bearing means, comprising an information-reading head which is kept floating by an air flow generated by a rotation of said information-bearing means, and a suspension for supporting said information-reading head such that a center of gravity of said information-reading head is positioned between a center of support of said information-reading head around which said suspension is twisted, and a rear end, with respect to a direction of relative movement of the information-recording head to the rotating information bearing means, of said information-reading head.

16. The information-reading head apparatus according to claim 14, wherein said center of gravity of said information-reading head is positioned behind said center of support in a range of 5-50% per a distance (100%) between said center of support and said rear end of said information-reading head.

17. The information-reading head apparatus according to claim 14 wherein said center of support is substantially a geometrical center of said information-reading head in a horizontal plane.

18. The information-reading head apparatus according to claim 17, wherein said center of support is positioned substantially at a middle point between a front end, with respect to said direction of relative movement of the information-recording head to the rotating information bearing means, and the rear end of said information reading head.

* * * * *